US008611069B2

(12) United States Patent
Kruglick

(10) Patent No.: US 8,611,069 B2
(45) Date of Patent: Dec. 17, 2013

(54) ULTRACAPACITORS EMPLOYING PHASE CHANGE MATERIALS

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 248 days.

(21) Appl. No.: 12/999,250

(22) PCT Filed: May 18, 2010

(86) PCT No.: PCT/US2010/035275
§ 371 (c)(1),
(2), (4) Date: Dec. 15, 2010

(87) PCT Pub. No.: WO2011/146052
PCT Pub. Date: Nov. 24, 2011

(65) Prior Publication Data
US 2011/0286150 A1    Nov. 24, 2011

(51) Int. Cl.
*H01G 9/00* (2006.01)
(52) U.S. Cl.
USPC ........... 361/502; 361/503; 361/504; 361/512; 361/516; 361/519
(58) Field of Classification Search
USPC ................. 361/502–504, 509–512, 516, 517, 361/525–529
See application file for complete search history.

(56) References Cited

U.S. PATENT DOCUMENTS

| 4,745,278 | A | 5/1988 | Hanson |
| 5,682,288 | A * | 10/1997 | Wani ............................. 361/502 |
| 6,110,321 | A | 8/2000 | Day et al. |
| 6,215,278 | B1 * | 4/2001 | Okamura et al. ............. 320/119 |
| 6,258,608 | B1 | 7/2001 | Jung |
| 6,565,701 | B1 | 5/2003 | Jerabek et al. |
| 6,602,742 | B2 | 8/2003 | Maletin et al. |
| 6,787,235 | B2 | 9/2004 | Nesbitt et al. |
| 7,002,800 | B2 | 2/2006 | Elias et al. |
| 7,324,328 | B2 | 1/2008 | Narendra et al. |
| 2007/0097594 | A1 | 5/2007 | Delince et al. |
| 2008/0073558 | A1 | 3/2008 | Howell et al. |

FOREIGN PATENT DOCUMENTS

| CN | 101592455 A | 12/2009 |
| JP | 2005327760 A | 11/2005 |
| WO | 9904429 A1 | 1/1999 |
| WO | 2008017156 A2 | 2/2008 |

OTHER PUBLICATIONS

Stewart, et al., Modeling the Performance of Lithium-Ion Batteries and Capacitors during Hybrid-Electric-Vehicle Operation, Journal of the Electrochemical Society, 155(9) A664-A671 (2008).

Lee, D.H. et al., Modelling of the thermal behaviour of an ultracapacitor for a 42-V automotive electrical system, Journal of Power Sources 175, No. 1 (2008): 664-668.

Miller, J.R. and Susannah Butler, Capacitor system life reduction caused by cell temperature variation, accessed on Dec. 15, 2010 at http://www.nesscap.com/data_nesscap/papers/2006/Capacitor%20System%20Life%20Reduction%20Caused%20by%20Cell%20Temperature%20Variation.pdf.

(Continued)

*Primary Examiner* — Nguyen T Ha

(57) ABSTRACT

Implementations and techniques for employing phase change materials in ultracapacitor devices or systems are generally disclosed.

18 Claims, 7 Drawing Sheets

(56) References Cited

OTHER PUBLICATIONS

Kobayashi, Yoshihiro, Acceleration coefficient for the molded-type electric double layer capacitor (EDLC), Proc. 42nd Electronic Components and Technology Conference, May 18-20, 1992, pp. 617-623, San Diego, California.

Miller, J.R. and S.M. Butler, and I. Goltser, Electrochemical capacitor life predictions using accelerated test methods, Proceedings of the 42nd Power Sources Conference, paper 24.6, p. 581, Philadelphia, Pennsylvania (Jun. 12-15, 2006).

Davis, S., "Cooling Trends Direct Efficient Thermal Design," Jun. 1, 2002 12:00 PM, © 2011 Penton Media, Inc. All rights reserved, accessed at: http://powerelectronics.com/mag/power_cooling_trends_direct/.

International Search Report for International Application No. PCT/US2010/035275, PCT/ISA, mailed on Jun. 30, 2010.

Sabbah, R., et al., "Active (air-cooled) vs. passive (phase change material) thermal management of high power lithium-ion packs: Limitation of temperature rise and uniformity of temperature distribution", Journal of Power Sources, vol. 182, Issue 2, Aug. 1, 2008, pp. 630-638. doi:10.1016/j.jpowsour.2008.03.082.

* cited by examiner

800 A computer program product.

802 A signal bearing medium.

804 at least one of
one or more instructions for receiving phase change material;
one or more instructions for receiving ultracapacitor components;
one or more instructions for arranging at least some phase change material adjacent to ultracapacitor components to form one or more ultracapacitor devices;

one or more instructions for receiving phase change material at a forming tool;

one or more instructions for using a forming tool to arrange phase change material adjacent to ultracapacitor components;

one or more instructions for arranging ultracapacitor devices to form an ultracapacitor bank;

one or more instructions for arranging at least some phase change material adjacent to an ultracapacitor bank; or one or more instructions for forming at least one of a separator or a current collector from phase change material.

| 806 a computer-readable medium. | 808 a recordable medium. | 810 a communications medium. |

FIG. 8

ULTRACAPACITORS EMPLOYING PHASE CHANGE MATERIALS

RELATED APPLICATION

This application is a 371 national stage entry of International Application No. PCT/US10/35275, filed on May 18, 2010 which is hereby incorporated by reference in its entirety.

BACKGROUND

Unless otherwise indicated herein, the approaches described in this section are not prior art to the claims in this application and are not admitted to be prior art by inclusion in this section.

Ultracapacitors, also known as electric double-layer capacitors, may have higher energy densities when compared to other capacitor devices, such as electrolytic capacitors, and have emerged as important energy storage devices in automotive, electrical and industrial applications. Ultracapacitors are often employed to provide short bursts of power, for example, to smooth out variations in electrical supply or demand. During such burst operation, ultracapacitors may produce substantial pulses of thermal energy and management of such thermal energy may become an important issue in the design and implementation of ultracapacitor devices and/or systems.

Phase change materials, such as phase change metal alloys including, for example, some alloys of Copper, Aluminum and Nickel, may reversibly undergo phase transitions between Martensitic and Austenitic crystalline structures in response to thermal impulses. Latent energy associated with such phase transitions may substantially increase the local heat capacity of these materials. These effects may allow phase change materials to more efficiently dissipate heat in response to thermal impulses.

SUMMARY

Ultracapacitor systems and/or devices are described including one or more ultracapacitor cores, each core having a separator and a current collector. Where the systems and/or devices include a support structure located next to at least part of the ultracapacitor core, and where at least one of the separator, the current collector, or the support structure includes phase change material.

In addition, processes of forming ultracapacitor systems and/or devices are described including receiving phase change material, receiving ultracapacitor components, and then arranging at least some of the phase change material next to the ultracapacitor components to form one or more ultracapacitor devices.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The subject matter of the present disclosure is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 8 is an illustration of an example computer program product; and

DETAILED DESCRIPTION

Figure 1:
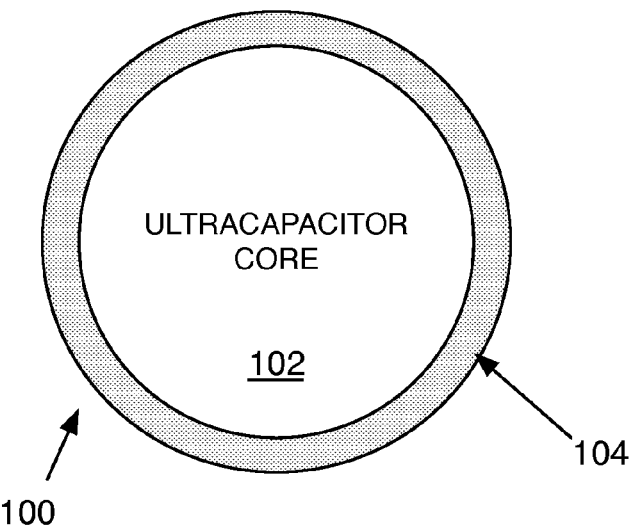
FIG. 1 is an illustrative diagram of an example ultracapacitor device.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the embodiments of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, and systems related to ultracapacitors employing phase change materials.

In ultracapacitors, thermal energy pulses may be produced during operation, in particular during burst operation. In accordance with the present disclosure, various ultracapacitor components and associated structures, such as support structures, may incorporate phase change materials such as phase change metal alloys. For example, in various implementations, ultracapacitor cell and/or bank components may be fabricated, at least in part, from phase change metal alloys. For instance, the interior framework between ultracapacitor cells, casings and/or the exterior framework surrounding one or more ultracapacitor cells, and/or internal ultracapacitor cell components such as current collectors and/or separators may include phase change metal alloys.

FIG. 1 illustrates an example ultracapacitor device 100 arranged in accordance with at least some embodiments of the present disclosure. As shown in FIG. 1, device 100 may include an ultracapacitor core 102 and a support structure or casing 104. In accordance with the present disclosure, casing 104 may include phase change materials such as phase change metal alloys. For example, although claimed subject matter is not limited in this regard, phase change metal alloys employed in ultracapacitor cell and/or bank components, such as casing 104, may include, but are not limited to: Ag—Cd 44/49 at. % Cd; Au—Cd 46.5/50 at. % Cd; Au—Cd 46.5/50 at. % Cd; Cu—Al—Ni 14/14.5 wt. % Al and 3/4.5 wt. % Ni; Cu—Sn approx. 15 at. % Sn; Cu—Zn 38.5/41.5 wt. % Zn; Cu—Zn—X (X=Si, Al, Sn); Fe—Pt approx. 25 at. % Pt; Mn—Cu 5/35 at. % Cu; Fe—Mn—Si; Pt alloys; Co—Ni—Al; Co—Ni—Ga; Ni—Fe—Ga; Ti—Pd; and/or Ni—Ti (~55% Ni). In some implementations, phase change materials other than phase change metal alloys, such as paraffin, for example, may be employed in ultracapacitor cell and/or bank components.

Figure 2:
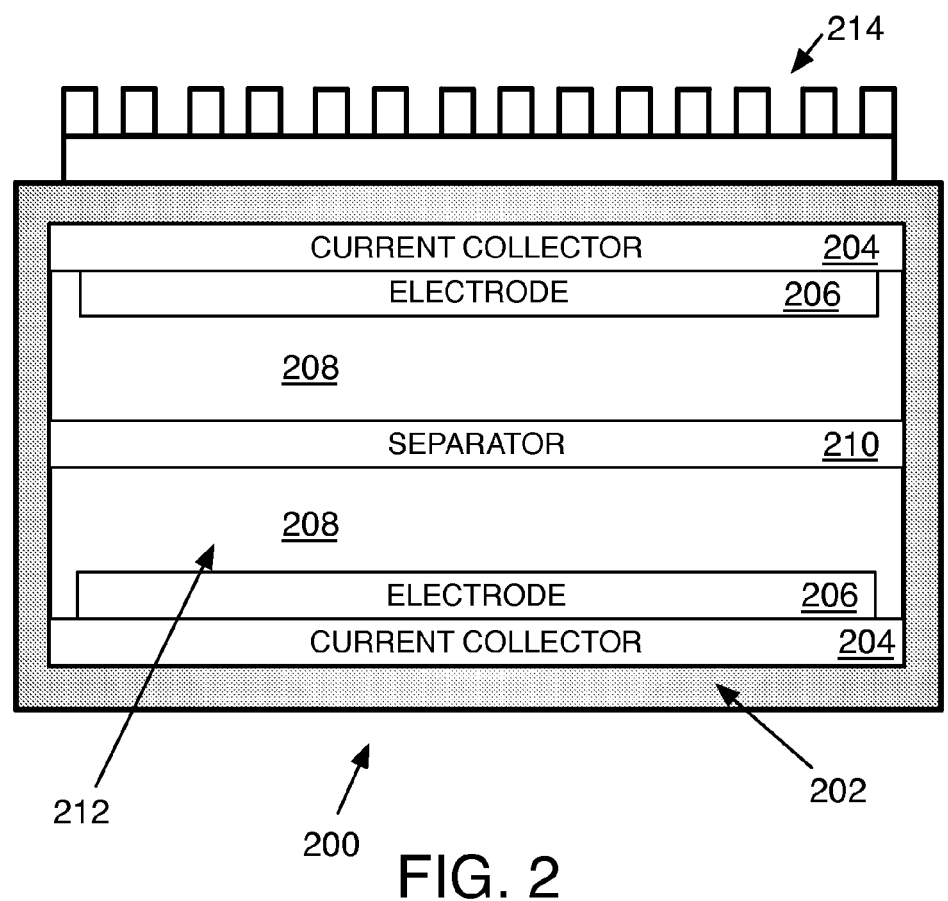
FIG. 2 is an illustrative diagram of another example ultracapacitor device.

FIG. 2 illustrates another example ultracapacitor device or cell 200 arranged in accordance with at least some embodiments of the present disclosure. As shown in FIG. 2, cell 200 may include support structure 202, current collectors 204, electrodes 206, electrolyte 208 and a porous separator 210. Although not limited in this regard, electrodes 206 may be formed from carbonaceous and/or Silicon bearing material. Further, although not limited in this regard, current collectors 204 may be formed, at least in part, from metals such as aluminum, titanium, nickel, stainless steel, or tantalum. Other components of cell 200, such as electrical leads coupled to current collectors 204, have not been illustrated in FIG. 2 in the interest of clarity.

Current collectors 204, electrodes 206, electrolyte 208 and separator 210 are collectively arranged to form an ultracapacitor core 212 having support structure 202 adjacent to core 212. In addition, device 200 may include a heat sink structure 214 located adjacent to support structure 202 and/or core 212.

In accordance with the present disclosure, support structure 202, current collectors 204, and/or separator 210 may include, at least in part, phase change materials such as phase change metal alloys. For example, one or more of the phase change metal alloys described above may be included in support structure 202, current collectors 204, and/or separator 210 instead of, or in addition to, metals such as aluminum, titanium, nickel, stainless steel, or tantalum.

Figure 3:
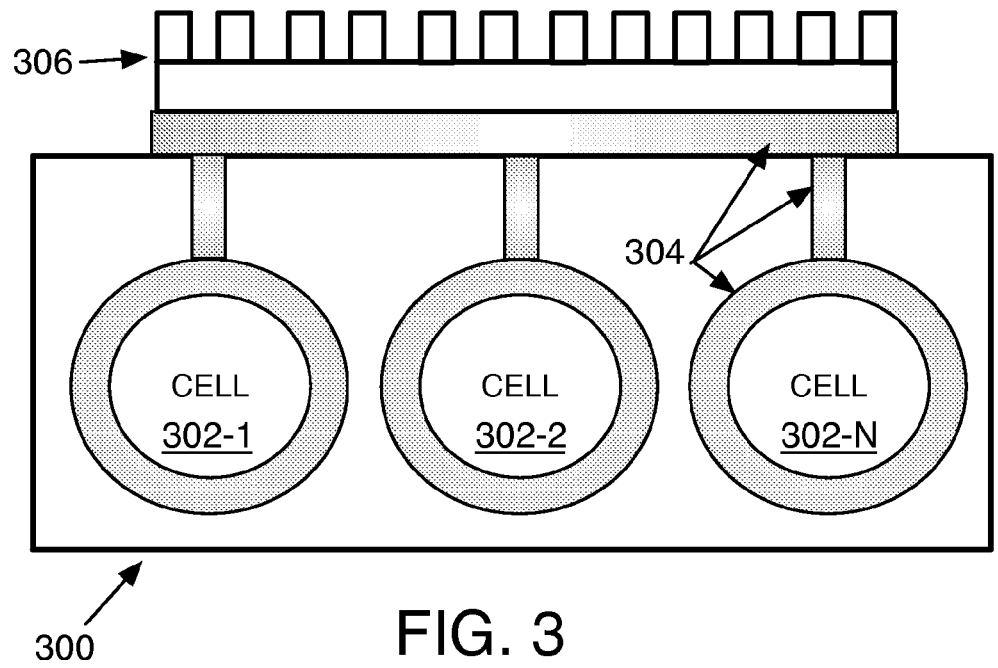
FIG. 3 is an illustrative diagram of an example ultracapacitor bank.

FIG. 3 illustrates an example ultracapacitor bank 300 configured in accordance with at least some embodiments of the present disclosure. As shown in FIG. 3, bank 300 includes N ultracapacitor cells 302-1, 302-2, ..., 302-N. Although not depicted in FIG. 3 in the interest of clarity, each ultracapacitor cell 302 may include a separator, current collectors, electrolyte and electrodes. Bank 300 also includes a support structure 304 located adjacent to the N ultracapacitor cells 302.

In some implementations, support structure 304 may be configured to substantially surround the N ultracapacitor cells 302. For example, structure 304 may include casing material located directly adjacent to cells 302 as well as other structures such as brackets, mounts, etc. that physically support cells 302 located within bank 300. Further, in some implementations, a heat sink structure 306 may be formed adjacent to support structure 304 and/or cells 302. In addition, in various implementations, the N ultracapacitor cells 302 may be electrically coupled together in a serial or in a parallel manner. In accordance with the present disclosure, phase change materials such as phase change metal alloys described above may be included in support structure 304.

While example bank 300, as shown in FIG. 3, includes three or more ultracapacitor cells 302, it should be understood that bank 300 may include one ultracapacitor containing one cell, one ultracapacitor containing a plurality of cells, a plurality of ultracapacitors each containing one cell, a plurality of ultracapacitors each containing a plurality of cells, and so on, claimed subject matter not being limited to particular configurations thereof.

Figure 4:
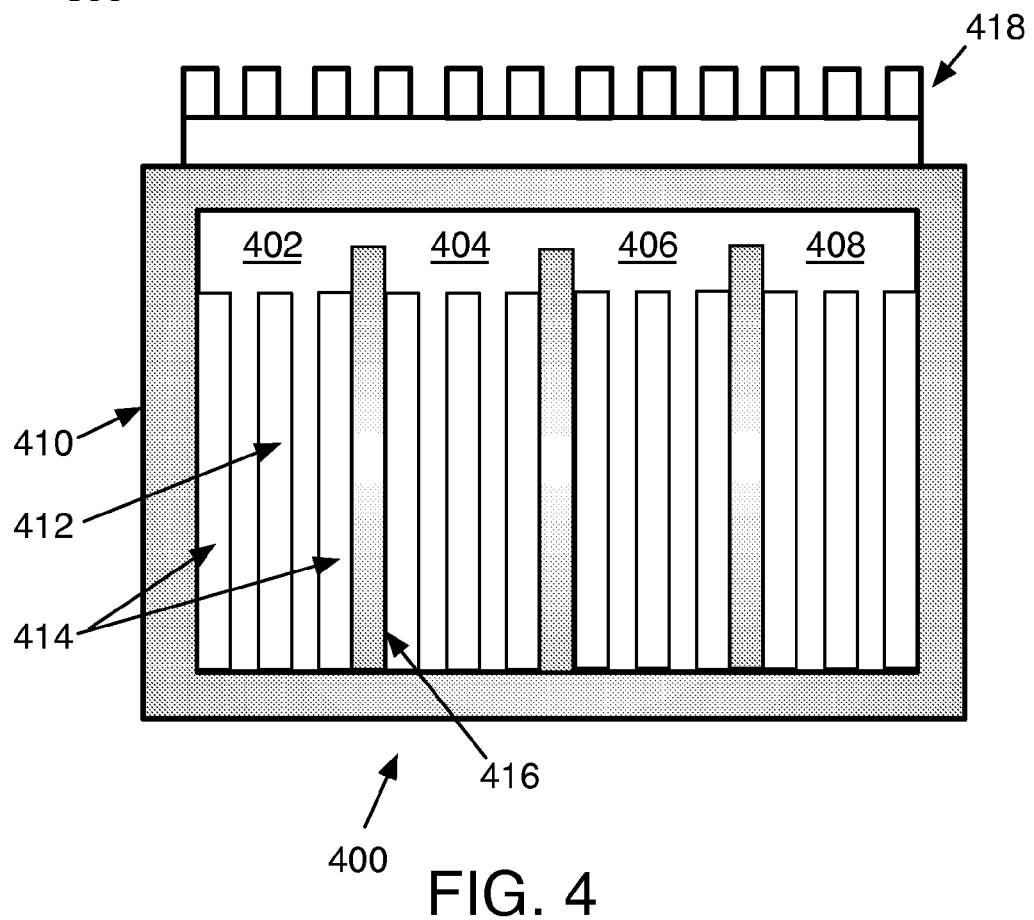
FIG. 4 is an illustrative diagram of another example ultracapacitor bank.

FIG. 4 illustrates an example ultracapacitor bank 400 arranged in accordance with at least some embodiments of the present disclosure. As shown in FIG. 4, bank 400 includes four ultracapacitor cells 402, 404, 406 and 408 and support structure 410. Each ultracapacitor cell 402, 404, 406 and 408 includes a separator 412 and electrodes 414 located on either side of separator 412. Each cell 402, 404, 406 and 408 also includes current collectors 416 where some of current collectors 416 may be shared by adjacent ultracapacitor cells 404 and 406 while portions of support structure 410 may also act as current collectors for cells 402 and 408. Each cell 402, 404, 406 and 408 may also include additional components such as electrical leads, electrolyte, insulators, etc. not depicted in FIG. 4 in the interest of clarity.

In some implementations, support structure 410 may substantially surround ultracapacitor cells 402, 404, 406 and 408. Further, in some implementations, a heat sink structure 418 may be formed adjacent to support structure 410 and/or cells 402, 404, 406 and 408. In addition, in some implementations, ultracapacitor cells 402, 404, 406 and 408 may be electrically coupled together in a serial or in a parallel manner. While example bank 400, as shown in FIG. 4, includes four ultracapacitor cells, it should be understood that bank 400 may include one ultracapacitor containing one cell, one ultracapacitor containing a plurality of cells, a plurality of ultracapacitors each containing one cell, a plurality of ultracapacitors each containing a plurality of cells, and so on claimed subject matter not being limited to particular configurations thereof.

In accordance with the present disclosure, support structure 410, current collectors 416, and/or separators 412 may include, at least in part, phase change materials such as phase change metal alloys. For example, one or more of the phase change metal alloys described above may be included in support structure 410, current collectors 416, and/or separators 412.

Referring to the example implementations shown in FIGS. 1-4, the support structures shown therein may include a variety of components employed in constructing and/or packaging ultracapacitor devices and/or systems. Such structures may include interior framework components arranged between cells or chambers of ultracapacitor and/or ultracapacitor banks including casing material at least partially surrounding one or more ultracapacitor cores, such as casing 104 adjacent to core 102. Further detail regarding ultracapacitor structural components, as well as details regarding the structure and/or composition of ultracapacitor electrodes and electrolytes, may be found in U.S. Pat. Nos. 6,110,321 and 6,565,701, the entire disclosures of which are incorporated herein by reference.

Figure 5:
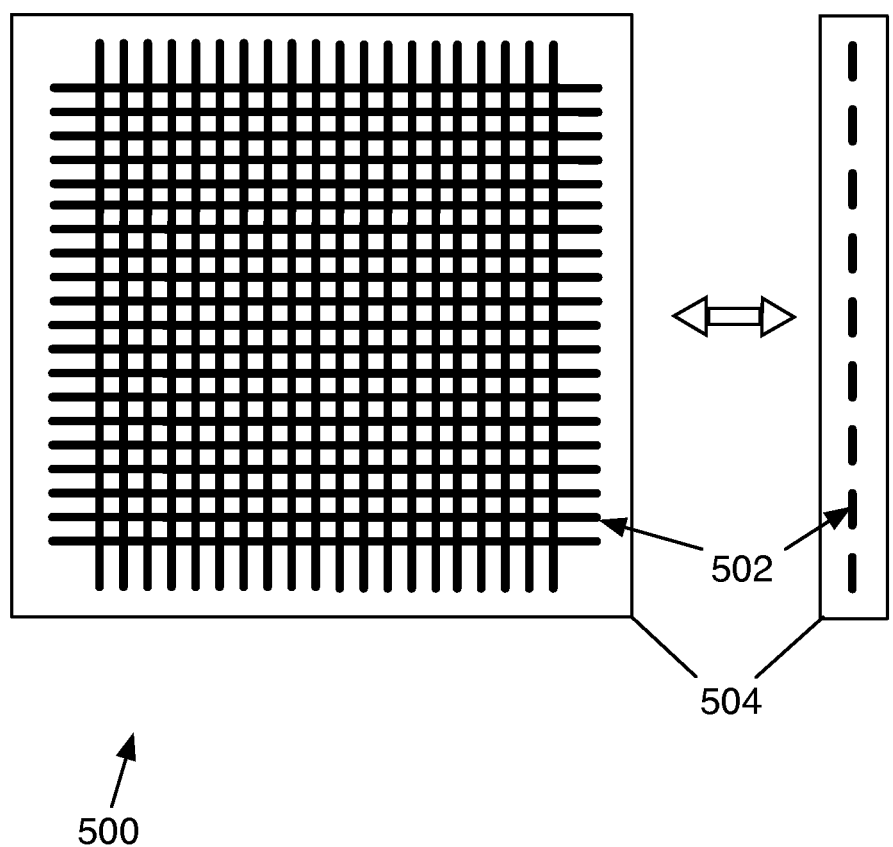
FIG. 5 is an illustrative diagram of an example ultracapacitor separator.

FIG. 5 illustrates an example ultracapacitor separator 500 arranged in accordance with at least some implementations of the present disclosure. Separator 500 includes a mesh or screen 502 of phase change materials such as phase change metal alloys supporting and/or being surrounded by a porous insulating material 504. For example, screen 502 may be at least partially constructed from one or more of the phase change metal alloys described above. Insulating material 504 may include a membrane dielectric, a porous insulating polymer or similar material.

Figure 6:
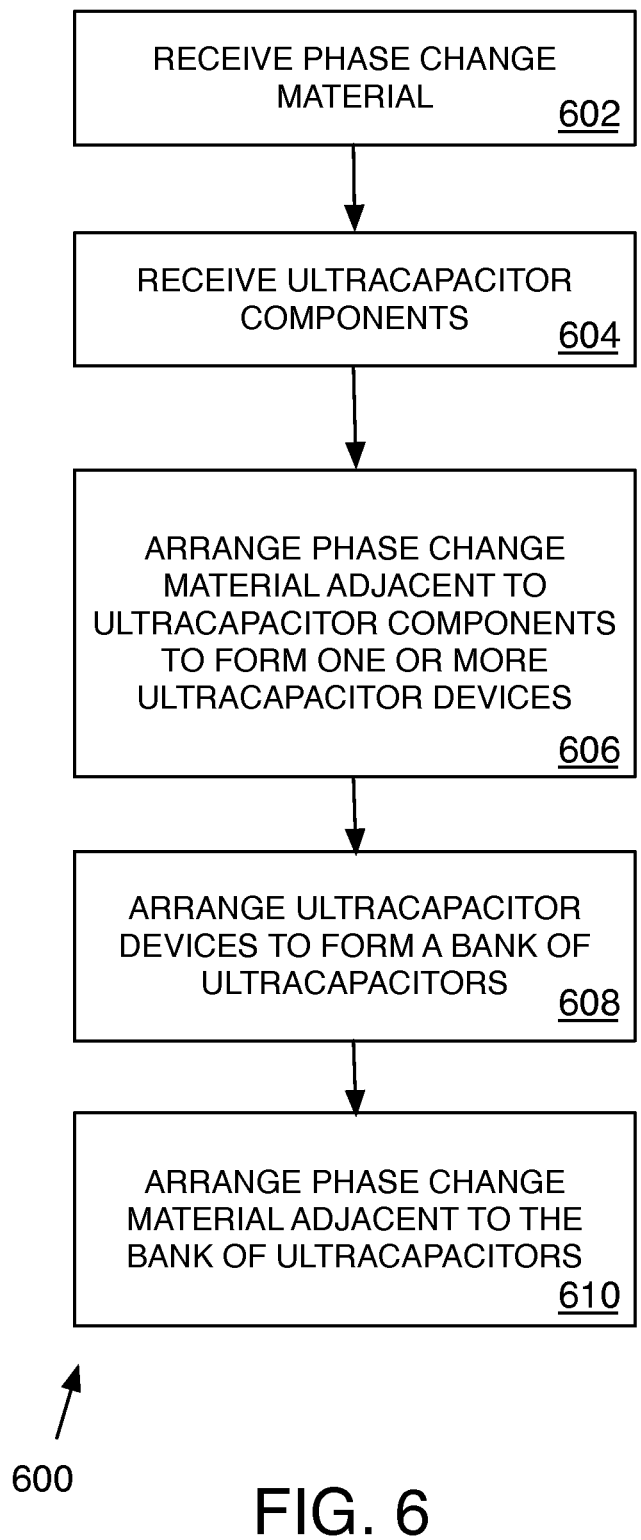
FIG. 6 is an illustration of an example process for the manufacture of ultracapacitor devices.

FIG. 6 illustrates a flow diagram of a process 600 for manufacturing ultracapacitors out of phase change materials according to various implementations of the present disclosure. Process 600 may include one or more operations, functions or actions as illustrated by one or more of blocks 602, 604, 606, 606, 608 and/or 610. Process 600 may begin at block 602.

At block 602, phase change material may be received. For example, one or more of the phase change metal alloys mentioned above may be received in block 602 at one or more forming devices or tools. For instance, phase change materials may be received in block 602 at a forming tool such as described in U.S. Pat. No. 6,110,321, the entire disclosure of which is incorporated by reference herein. Block 602 may be followed by block 604.

In block 604, ultracapacitor components may be received. For example, ultracapacitor components such as electrodes, current collectors and/or separators may be received in block 604 at the one or more forming devices or tools received the phase change material in block 602. Block 604 may be followed by block 606.

At block 606, the phase change material received in block 602 may be arranged with respect to the ultracapacitor components previously received in block 604. For example, the one or more devices or tools that received the phase change material in block 602 and the ultracapacitor components in block 604 may be used in block 606 to arrange the phase change material with respect to the ultracapacitor components.

In some implementations of block 606, phase change material such as phase change metal alloys may be arranged to substantially surround the ultracapacitor core components. For example, phase change metal alloys may be subjected to machining, crimping, cold mechanical bending, grinding, cutting, etc. in the process of undertaking block 606. Further, for example, phase change metal alloys in sheet form may be bent, welded and/or compressed around one or more ultracapacitor cores in undertaking block 606. In addition, phase change metal alloys in wire form may be wound around and/or through one or more ultracapacitor cores in undertaking block 606.

Process 600 at blocks 602, 604 and 606 may be used to manufacture ultracapacitor devices such as, for example, ultracapacitor devices 100 and 200 of FIGS. 1 and 2 respectively. For example, phase change material may be provided to or received at a forming tool and the forming tool may be used to arrange the phase change material with respect to the ultracapacitor components. For example, as noted above, forming tools may be used to encase one or more ultracapacitor cores in one or more phase change metal alloys, such as one or more of the phase change metal alloys described above.

Further, various blocks of process 600 may be used to manufacture ultracapacitor components. For example, phase change material provided in block 602 may be used in forming ultracapacitor components such as current collectors and/or separators. For example, referring also to FIG. 5, phase change metal alloys, such as one or more of the phase change metal alloys described above, may be provided in block 602 in the form of a mesh 502 and then used, in block 606, to form a separator 500 by embedding the mesh 502 within, for example, a porous dielectric 504.

Block 606 may be followed by block 608. At block 608, ultracapacitor devices, such as two or more devices formed in block 606, may be arranged to form a bank of ultracapacitors. Block 608 may be followed by block 610.

In block 610, phase change material such as those phase change metal alloys described above, may be formed adjacent to the ultracapacitor bank resulting from block 608. For example, blocks 608 and 610 may be undertaken to form capacitor banks similar to banks 300 and 400 of FIGS. 3 and 4 respectively. For instance, referring to the example implementation of FIG. 3, phase change metal alloys may be used to form the portions of support structure 304 extending from ultracapacitor cells 302 to heat sink 306.

Figure 7:
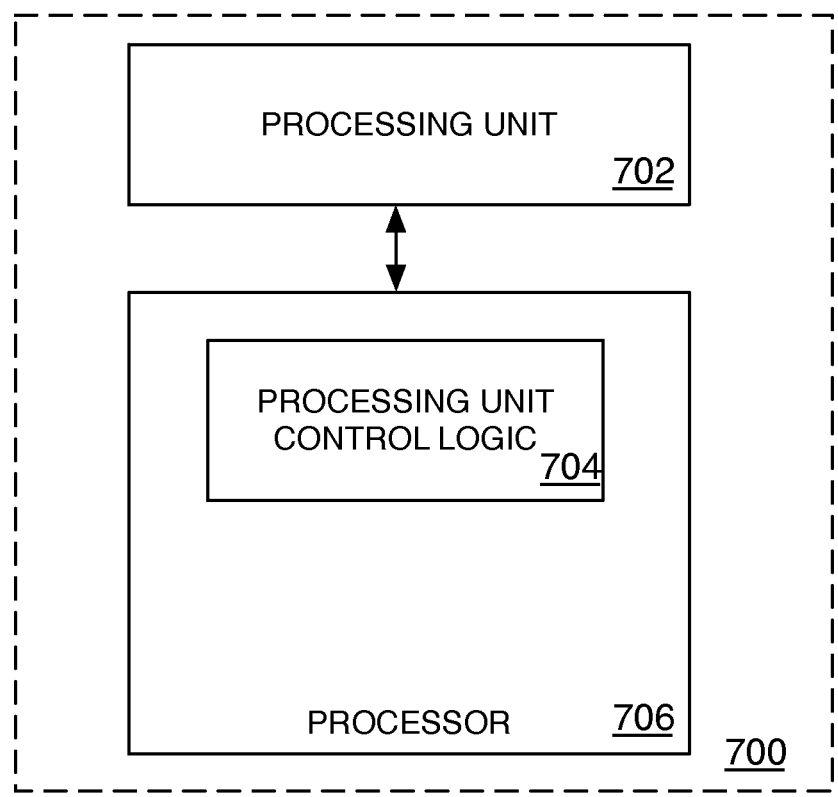
FIG. 7 is an illustrative diagram of an example system.

FIG. 7 illustrates an example system 700 for manufacturing ultracapacitor devices and/or systems employing phase change materials in accordance with at least some implementations of the present disclosure. System 700 may include a production unit 702 operably coupled to a processor 706 that may include production unit control logic 704. Production unit 702 may include any arrangement of production and assembly tools and/or systems, such as one or more forming tools, that may be utilized to undertake the manufacture of devices and/or systems such as those illustrated in FIGS. 1-5 using, for example, process 600.

Processing unit control logic 704 may be configured to provide functional control of any arrangement of production and assembly tools and/or systems, such as one or more forming tools, and may include hardware, software or firmware logic and/or any combination thereof although claimed subject matter is not limited to specific types or manifestations of processing unit control logic. Processor 706 may be a microprocessor or Central Processing Unit (CPU). In other implementations, processor 706 may be an Application Specific Integrated Circuit (ASIC), a Field Programmable Gate Array (FPGA), a digital signal processor (DSP), or other integrated formats. Processor 706 and processing unit 702 may be configured to communicate by any suitable means, such as, for example, by wired connections or wireless connections.

FIG. 8 illustrates an example computer program product 800 arranged in accordance with at least some examples of the present disclosure. Program product 800 may include a signal bearing medium 802. Signal bearing medium 802 may include one or more instructions 804 that, when executed by, for example, a processor, may provide the functionality described above with respect to FIG. 6. Thus, for example, referring to the system of FIG. 7, processor 706 and/or processing unit control logic 704 may undertake one or more of the blocks shown in FIG. 6 in response to instructions 804 conveyed by medium 802.

In some implementations, signal bearing medium 802 may encompass a computer-readable medium 806, such as, but not limited to, a hard disk drive, a Compact Disc (CD), a Digital Video Disk (DVD), a digital tape, memory, etc. In some implementations, signal bearing medium 802 may encompass a recordable medium 808, such as, but not limited to, memory, read/write (R/W) CDs, R/W DVDs, etc. In some implementations, signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, referring to the system of FIG. 7, program product 800 may be wirelessly conveyed to processor 706 by signal bearing medium 802, where signal bearing medium 802 is conveyed to system 700 by a wireless communications medium 810 (e.g., an wireless communications medium conforming with the 802.11 standard).

Figure 9:
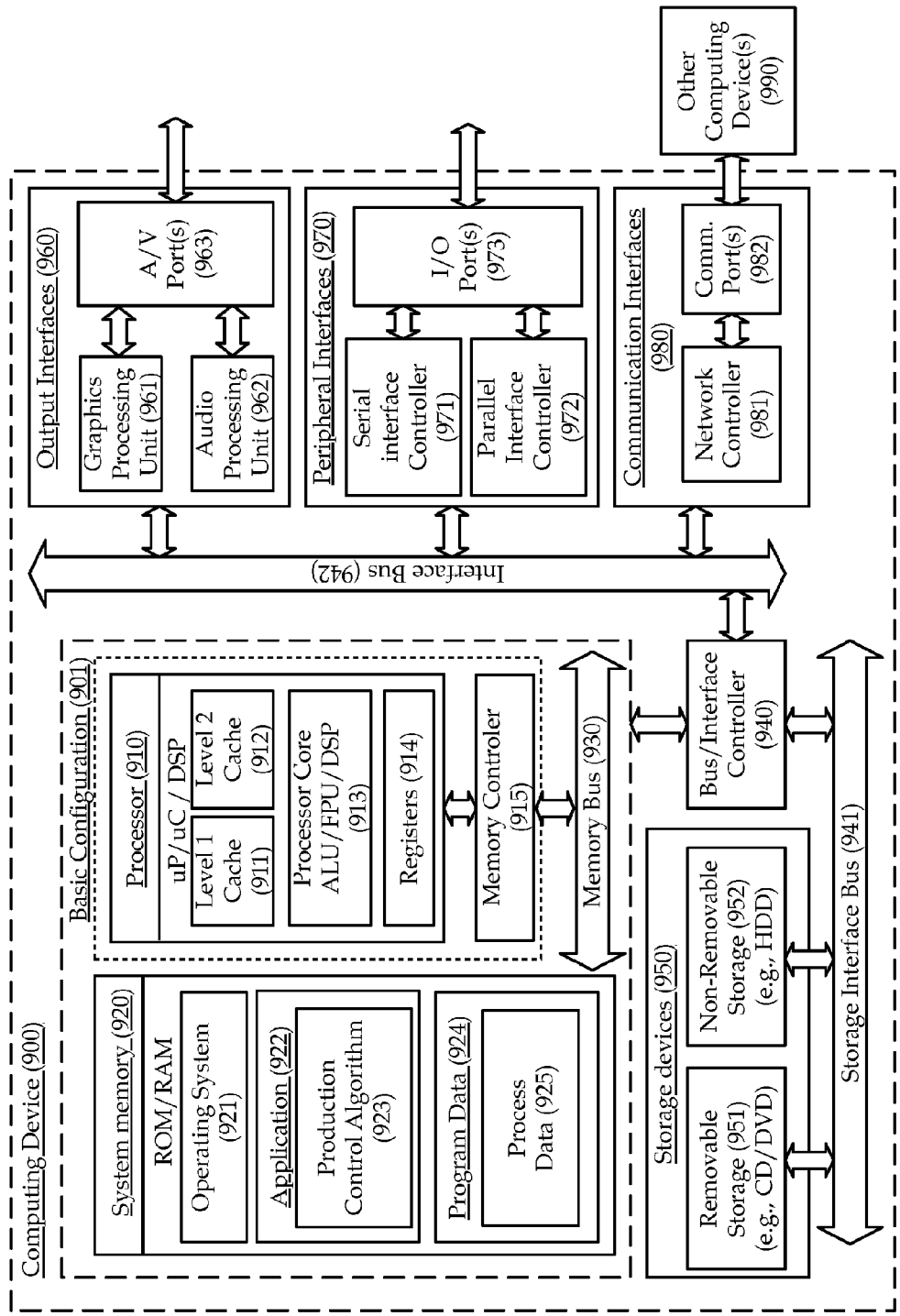
FIG. 9 is an illustration of an example computing device, all arranged in accordance with at least some embodiments of the present disclosure.

FIG. 9 is a block diagram illustrating an example computing device 900. In some examples, control of the manufacturing ultracapacitor devices and/or systems employing phase change materials may be provided by computing device 900. In a very basic configuration 901, computing device 900 typically includes one or more processors 910 and system memory 920. A memory bus 930 can be used for communicating between the processor 910 and the system memory 920.

Depending on the desired configuration, the system memory 920 can be of any type including but not limited to volatile memory (such as RAM), non-volatile memory (such as ROM, flash memory, etc.) or any combination thereof. System memory 920 typically includes an operating system 921, one or more applications 922, and program data 924. Application 922 may include instructions 923 that are arranged to perform the functions as described herein including the actions described with respect to providing control of production systems that may undertake actions described with respect to the flow chart shown in FIG. 6. Program Data 924 may include process data 925 that may be useful for implementing instructions 923. In some examples, application 922 can be arranged to operate with program data 924 on an operating system 921 such that implementations of producing ultracapacitor devices and/or systems employing phase change material, as described herein, may be provided. This described basic configuration is illustrated in FIG. 9 by those components within dashed line 901.

Computing device 900 can have additional features or functionality, and additional interfaces to facilitate communications between the basic configuration 901 and any required devices and interfaces. For example, a bus/interface controller 940 can be used to facilitate communications between the basic configuration 901 and one or more data storage devices 950 via a storage interface bus 941. The data storage devices 950 can be removable storage devices 951, non-removable storage devices 952, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 920, removable storage 951 and non-removable storage 952 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media can be part of device 900.

Computing device 900 can also include an interface bus 942 for facilitating communication from various interface devices (e.g., output interfaces, peripheral interfaces, and communication interfaces) to the basic configuration 901 via the bus/interface controller 940. Example output interfaces 960 include a graphics processing unit 961 and an audio processing unit 962, which can be configured to communicate to various external devices such as a display or speakers via one or more A/V ports 963. Example peripheral interfaces 960 include a serial interface controller 971 or a parallel interface controller 972, which can be configured to communicate with external devices such as input devices (e.g., keyboard, mouse, pen, voice input device, touch input device, etc.) or other peripheral devices (e.g., printer, scanner, etc.) via one or more I/O ports 973. An example communication interface 980 includes a network controller 981, which can be arranged to facilitate communications with one or more other computing devices 990 over a network communication via one or more communication ports 982. A network communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 900 can be implemented as a portion of a small-form factor portable (or mobile) electronic device such as a cell phone, smart phone, a personal data assistant (PDA), a personal media player device, a wireless web-watch device, a personal headset device, an application specific device, or a hybrid device that include any of the above functions. Computing device 900 can also be implemented as a personal computer including both laptop computer and non-laptop computer configurations or implemented in a workstation or a server configuration.

References made in this disclosure to the term "responsive to" or "in response to" are not limited to responsiveness to only a particular feature and/or structure. A feature may also be responsive to another feature and/or structure and also be located within that feature and/or structure. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It should also be understood that, the term "optimize" may include maximization and/or minimization. The term "minimization" and/or the like as used herein may include a global minimum, a local minimum, an approximate global minimum, and/or an approximate local minimum. Likewise, it should also be understood that, the term "maximization" and/or the like as used herein may include an global maximum, a local maximum, an approximate global maximum, and/or an approximate local maximum.

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. An apparatus, comprising:
   an ultracapacitor core including a separator and a current collector; and
   a support structure adjacent to at least a portion of the ultracapacitor core,
   wherein at least one of the separator, the current collector, or the support structure comprises a phase change metal alloy material.

2. The apparatus of claim 1, wherein the phase change metal alloy comprises at least one of Ag—Cd 44/49 at. % Cd; Au—Cd 46.5/50 at. % Cd; Au—Cd 46.5/50 at. % Cd; Cu—Al—Ni 14/14.5 wt. % Al and 3/4.5 wt. % Ni; Cu—Sn approximately 15 at. % Sn; Cu—Zn 38.5/41.5 wt. % Zn; Cu—Zn—X (X=Si, Al, Sn); Fe—Pt approx. 25 at. % Pt; Mn—Cu 5/35 at. % Cu; Fe—Mn—Si; Pt alloys; Co—Ni—Al; Co—Ni—Ga; Ni—Fe—Ga; Ti—Pd; or Ni—Ti (approximately 55% Ni).

3. The apparatus of claim 1, wherein the separator comprises a phase change metal alloy mesh adjacent to a dielectric membrane.

4. The apparatus of claim 1, wherein the support structure substantially surrounds the ultracapacitor core.

5. The apparatus of claim 1, further comprising:
   a heat sink structure adjacent the support structure.

6. An ultracapacitor system, comprising:
   a plurality of ultracapacitor cells, each ultracapacitor cell including a separator and a current collector; and
   a support structure adjacent to at least a portion of the plurality of ultracapacitor cells,
   wherein at least one of the separator, the current collector, or the support structure comprises phase change material configured to transition between martensitic and austenitic crystalline structures in response to thermal impulses.

7. The ultracapacitor system of claim 6, wherein phase change material comprises a phase change metal alloy.

8. The ultracapacitor system of claim 7, wherein the phase change metal alloy comprises at least one of Ag—Cd 44/49 at. % Cd; Au—Cd 46.5/50 at. % Cd; Au—Cd 46.5/50 at. % Cd; Cu—Al—Ni 14/14.5 wt. % Al and 3/4.5 wt. % Ni; Cu—Sn approximately 15 at. % Sn; Cu—Zn 38.5/41.5 wt. % Zn; Cu—Zn—X (X=Si, Al, Sn); Fe—Pt approx. 25 at. % Pt; Mn—Cu 5/35 at. % Cu; Fe—Mn—Si; Pt alloys; Co—Ni—Al; Co—Ni—Ga; Ni—Fe—Ga; Ti—Pd; or Ni—Ti (approximately 55% Ni).

9. The ultracapacitor system of claim 6, wherein the separator comprises a phase change metal alloy mesh adjacent to a dielectric membrane.

10. The ultracapacitor system of claim 6, wherein the support structure substantially surrounds the plurality of ultracapacitor cells.

11. The ultracapacitor system of claim 6, further comprising:
    a heat sink structure adjacent the support structure.

12. The ultracapacitor system of claim 6, wherein the plurality of ultracapacitor cells comprise a plurality of ultracapacitor cells electrically coupled together in one of a serial or a parallel manner.

13. An ultracapacitor system, comprising:
    a plurality of ultracapacitor cells, at least one ultracapacitor cell including a separator and a current collector; and
    a support structure next to at least a portion of the plurality of ultracapacitor cells,
    wherein at least one of the separator, the current collector, or the support structure comprises phase change metal alloy material, and the plurality of ultracapacitor cells are electrically coupled together in one of a serial or a parallel manner.

14. The ultracapacitor system of claim 13, wherein the phase change metal alloy comprises at least one of Ag—Cd 44/49 at. % Cd; Au—Cd 46.5/50 at. % Cd; Au—Cd 46.5/50 at. % Cd; Cu—Al—Ni 14/14.5 wt. % Al and 3/4.5 wt. % Ni; Cu—Sn approximately 15 at. % Sn; Cu—Zn 38.5/41.5 wt. % Zn; Cu—Zn—X (X=Si, Al, Sn); Fe—Pt approx. 25 at. % Pt; Mn—Cu 5/35 at. % Cu; Fe—Mn—Si; Pt alloys; Co—Ni—Al; Co—Ni—Ga; Ni—Fe—Ga; Ti—Pd; or Ni—Ti (approximately 55% Ni).

15. The ultracapacitor system of claim 13, wherein the separator comprises a phase change metal alloy mesh adjacent to a dielectric membrane.

16. The ultracapacitor system of claim 13, wherein the support structure substantially surrounds the plurality of ultracapacitor cells.

17. The ultracapacitor system of claim 13, further comprising:
a heat sink structure adjacent the support structure.

18. The ultracapacitor system of claim 13, wherein the plurality of ultracapacitor cells comprise of a plurality of ultracapacitor cells configured to form an ultracapacitor bank.

* * * * *